(12) United States Patent
Uchino et al.

(10) Patent No.: US 10,880,866 B2
(45) Date of Patent: Dec. 29, 2020

(54) USER APPARATUS AND CELL CONTROL METHOD

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 116 days.

(21) Appl. No.: 15/536,969

(22) PCT Filed: Feb. 17, 2016

(86) PCT No.: PCT/JP2016/054564
§ 371 (c)(1),
(2) Date: Jun. 16, 2017

(87) PCT Pub. No.: WO2016/133112
PCT Pub. Date: Aug. 25, 2016

(65) Prior Publication Data
US 2017/0347337 A1    Nov. 30, 2017

(30) Foreign Application Priority Data

Feb. 20, 2015 (JP) .................................. 2015-032256

(51) Int. Cl.
*H04W 72/02* (2009.01)
*H04W 72/04* (2009.01)
*H04L 5/00* (2006.01)

(52) U.S. Cl.
CPC ............. *H04W 72/02* (2013.01); *H04L 5/001* (2013.01); *H04L 5/0098* (2013.01);
(Continued)

(58) Field of Classification Search
CPC . H04W 72/02; H04W 72/0453; H04W 72/04; H04W 72/042; H04L 5/001; H04L 5/0098
See application file for complete search history.

(56) References Cited

U.S. PATENT DOCUMENTS

2015/0045029 A1* 2/2015 Dalsgaard ......... H04W 36/0083
455/436
2015/0146696 A1* 5/2015 Golitschek Edler Von
Elbwart ................ H04L 1/0029
370/335
(Continued)

OTHER PUBLICATIONS

International Search Report issued in PCT/JP2016/054564 dated Apr. 26, 2016 (5 pages).
(Continued)

*Primary Examiner* — Minjung Kim
(74) *Attorney, Agent, or Firm* — Osha Bergman Watanabe & Burton LLP

(57) ABSTRACT

A user apparatus performing communications with a base station in a mobile communication system which supports carrier aggregation is provided. The user apparatus includes a processing unit configured to receive from the base station an instruction for adding one or more sub cells associated with a specific secondary cell group; a management unit configured to, upon receiving the instruction, store information in which the specific secondary cell group is associated with the one or more sub cells; and a control unit configured to, in the case where a command for performing an operation for the specific secondary cell group is received from the base station, perform the operation for any one of the one or more sub cells based on the association.

4 Claims, 15 Drawing Sheets

(52) U.S. Cl.
CPC ....... *H04W 72/04* (2013.01); *H04W 72/0453* (2013.01); *H04W 72/042* (2013.01)

(56) References Cited

U.S. PATENT DOCUMENTS

| | | | |
|---|---|---|---|
| 2015/0189516 A1* | 7/2015 | Seo .......................... | H04L 5/001 370/329 |
| 2017/0170941 A1* | 6/2017 | Yang ..................... | H04W 76/18 |
| 2017/0170942 A1* | 6/2017 | Qiu .......................... | H04L 5/001 |

OTHER PUBLICATIONS

Written Opinion of the International Searching Authority issued in PCT/JP2016/054564 dated Apr. 26, 2016 (3 pages).

MediaTek Inc.; "Cross-carrier scheduling for CA enhancement beyond 5CCs"; 3GPP TSG-RAN2 #89 Meeting, R2-150289; Athens, Greece; Feb. 9-13, 2015 (4 pages).

MediaTek Inc.; "PUCCH on SCell for CA enhancement beyond 5CCs"; 3GPP TSG-RAN2 #89 Meeting, R2-150290; Athens, Greese; Feb. 9-13, 2015 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in corresponding European Patent Application No. 16752498.2, dated Jan. 31, 2018 (8 pages).

Huawei, et al., "Other considerations for carrier aggregation enhancement beyond 5 carriers", 3GPP TSG RAN WG1 Meeting #80, R1-150413, Athens, Greece, Feb. 9-13, 2015 (3 pages).

\* cited by examiner

| sCellIndex | subCellIndex | CONTROL TARGET SUB CELL |
|---|---|---|
| 1 | 1a | TRUE |
| 1 | 1b | FALSE |
| 2 | 2a | FALSE |
| 2 | 2b | TRUE |
| 3 | 3a | FALSE |
| 3 | 3b | TRUE |
| 4 | 4a | NA |
| 4 | 4b | NA |

USER APPARATUS AND CELL CONTROL METHOD

BACKGROUND OF THE INVENTION

1. Field of the Invention

The present invention relates to a user apparatus and a cell control method.

2. Description of the Related Art

Carrier aggregation (CA) is adopted in a long term evolution (LTE) system. In CA, communications are performed by having a predetermined bandwidth as a basic unit (maximum 20 MHz), and by using a plurality of carriers simultaneously. The carrier as a basic unit in the carrier aggregation is referred to as a component carrier (CC).

When CA is performed, a primary cell (PCell) with high reliability for securing connectivity and a secondary cell (SCell) are set (configured) for a user apparatus. The user apparatus is first connected to a PCell, and, if necessary, an SCell can be added. The PCell is the same as a single cell which supports radio link monitoring (RLM) and semi-persistent scheduling (SPS), etc.

The SCell is set (configured) for the user apparatus in addition to the PCell. Adding and removing of an SCell is performed by radio resource control (RRC) signaling. Right after an SCell is set for the user apparatus, the SCell is in a deactivated state. The SCell consequently becomes a cell capable of communications (capable of scheduling) when it is activated.

As illustrated in FIG. 1, in CA of LTE Rel-10, a plurality of CCs under the same base station are used. Further, in CA of Rel-10, for example, as illustrated in FIG. 2, a high-speed data rate is achieved by using wider bandwidth by bundling maximum five CCs. Further, multiple TA (MTA) which enables independent and different timing control between CCs used for CA is introduced in Rel-11, and thus, CA optimization by non-co-located CCs is realized. For example, it is illustrated in FIG. 3 that two timing advance groups (TAGs) (TAG #1, TAG #2) are allocated. TAG is a unit used for timing control.

On the other hand, in Rel-12, dual connectivity is proposed in which simultaneous communications are performed to realize high throughput by using CCs under different base stations. In other words, in dual connectivity, a user apparatus performs communications by simultaneously using radio resources of two physically different base stations.

Dual connectivity is a kind of CA, and is also referred to as Inter eNB CA (inter-base-station carrier aggregation). In dual connectivity, a master-eNB (MeNB) and a secondary-eNB (SeNB) are introduced. An example of dual connectivity is illustrated in FIG. 4. In an example of FIG. 4, an MeNB communicates with the user apparatus via CC #1, an SeNB communicates with the user apparatus via CC #2, and thus, dual connectivity (hereinafter referred to as DC) is realized.

In DC, a cell group including (one or multiple) cells under the MeNB is referred to as a master cell group (MCG), and a cell group including (one or multiple) cells under the SeNB is referred to as a secondary cell group (SCG). UL CCs are set in one or more SCells of SCG, in one of which SCells a PUCCH is set. Such an SCell is referred to as a primary SCell (PSCell).

For example, an example is illustrated in FIG. 5 in which TAG #1 and TAG #2 are set in CG #1, and TAG #3 is set in CG #2.

CITATION LIST

Non-Patent Literature

[NPL 1]
3GPP TS 36.300 V12.4.0 (2014 December)

SUMMARY OF THE INVENTION

Technical Problem

In conventional LTE, a user apparatus reports, to a base station, CA band combination which is supported by the user apparatus. It is necessary for the user apparatus to be capable of not only simultaneously setting the combination of CCs indicated in the reported CA band combination, but also having processing capacity to simultaneously activate all of the CCs to perform transmitting and receiving data.

In the conventional LTE specification, the number of configurable CCs per user apparatus is maximum 5. On the other hand, in LTE Rel. 13, in order to realize more flexible and high-speed radio communications, and to realize bundling of many CCs in successive unlicensed ultra-wide bands, CA enhancement has been discussed in which the limitation of maximum five CCs bundled in CA is removed. For example, CA in which maximum 32 CCs are bundled has been discussed. As an example, 16 CCs are bundled in FIG. 6. It should be noted that each cell consists of, for example, a CC, or a set of a downlink CC and an uplink CC, but, in the following, it may be considered that a cell and a CC have the same meaning.

As described above, in order to realize CA in which many CCs are bundled, in the conventional way of thinking, it is necessary to provide a user apparatus which has processing capacity to process all of the CCs. In order to provide such a user apparatus, it is necessary to greatly improve processing capacity of the user apparatus, and thus, there is a possibility that the user apparatus development will be delayed.

Therefore, an idea has been discussed in which, instead of the conventional way of thinking, the user apparatus is allowed to set more CCs than CCs the user apparatus is capable of processing simultaneously. SCells are activated to become communication-available in a range in which the user apparatus can process, and the activated SCells are dynamically switched as necessary. With the above operations, it is possible to perform a process in which the activated SCell is switched to an SCell with a good propagation state, and thus, it is possible to improve the throughput by increasing the degree of scheduling freedom.

However, in order to perform the process described above, in the current CA mechanism, there is no scheme for controlling which SCell should be assigned with a control mechanism such as sCellDeactivationTimer for managing time before deactivating a currently activated SCell, which is used by activated SCells.

FIG. 7 is a drawing illustrating a problem. A situation is illustrated in FIG. 7A in which, in conventional CA in which maximum 5 CCs are bundled, all four SCells are activated, and a control mechanism of sCellDeactivationTimer is assigned to each of the SCells in the user apparatus. As illustrated in FIG. 7A, the user apparatus controls the SCells by using control mechanisms corresponding to SCell #1 through SCell #4, respectively.

In FIG. 7B, in the case where CA bundling 8 CCs is realized, a situation is illustrated in which, as in conventional CA, a control mechanism of sCellDeactivationTimer is assigned to each of the SCells in the user apparatus. Further, in FIG. 7B, it is assumed that SCell #1, SCell #3, SCell #6, and SCell #8 are in an activated state, and SCell #2, SCell #4, SCell #5, and SCell #7 are in a deactivated state. According to conventional LTE, even in the case where the user apparatus does not have capability to control maximum 5 CCs simultaneously, the user apparatus must have control mechanisms corresponding to all of the SCells. However, it is not reasonable for the user apparatus to have control mechanisms for all of the SCell #1 through SCell #8 in spite of the fact that the user apparatus has capability to control only maximum 5 CCs simultaneously.

Therefore, it is considered to allow CA in which more than five CCs are bundled, to make the number of SCells which can be activated at the same time be maximum four, and to assign an SCell control mechanism to each of the activated SCells. As illustrated in FIG. 7A, in conventional CA, the maximum number of bundled CCs is five, and thus, it is possible for the user apparatus, which has sCellDeactivationTimer #1 through sCellDeactivationTimer #4 in advance, to assign sCellDeactivationTimer #1 through sCellDeactivationTimer #4 to activated SCell #1 through SCell #4, respectively. However, in the case where CA in which more than five CCs are bundled is allowed, there is no existing scheme for assigning which SCell control mechanism to which SCell. For example, as illustrated in FIG. 7C, in order to assign sCellDeactivationTimer #1 through sCellDeactivationTimer #4 to activated SCells, there is no control scheme for assigning which sCellDeactivationTimer to which SCell. Specifically, for example, if SCell #6 is activated, then the user apparatus cannot determine whether the sCellDeactivationTimer #1 should be assigned to SCell #6, sCellDeactivationTimer #2 should be assigned to SCell #6, sCellDeactivationTimer #3 should be assigned to SCell #6, or sCellDeactivationTimer #4 should be assigned to SCell #6.

In view of the above, the present invention is made. An object of the present invention is to provide a technique in which, in the case where CA is performed in which an exceeding number of simultaneously controllable CCs are bundled, it is possible to perform communications by appropriately controlling CCs.

Solution to Problem

A user apparatus is provided for communicating with a base station in a mobile communication system in which carrier aggregation is supported. The user apparatus includes a processing unit configured to accept from the base station an instruction for adding one or more sub cells corresponding to a specific secondary cell group; a management unit configured to store information in which the specific secondary cell group is associated with the one or more sub cells; and a control unit configured to, in the case where a command indicating an operation for the specific secondary cell group is received from the base station, perform the operation for any one of the one or more sub cells.

Advantageous Effects of Invention

According to an embodiment, a technique is provided in which, in the case where CA is performed and an exceeding number of simultaneously controllable CCs are bundled, it is possible to perform communications by appropriately controlling CCs.

DETAILED DESCRIPTION OF THE PREFERRED EMBODIMENTS

Figure 1:
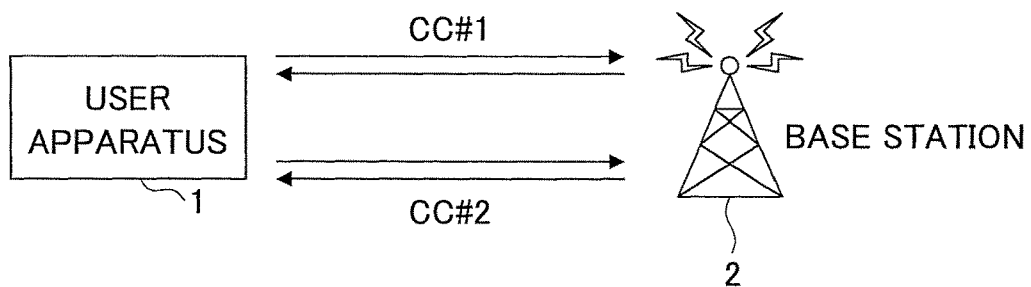
FIG. 1 is a drawing illustrating CA of LTE Rel-10.

In the following, referring to the drawings, embodiments of the present invention will be described. It should be noted that the embodiments described below are merely examples and the embodiments to which the present invention is applied are not limited to the following embodiments. In an embodiment, a target is an LTE mobile communication system. However, an embodiment is not limited to LTE, and can be applied to other mobile communication systems. Further, in an embodiment, it is assumed as a prerequisite in the description that a carrier aggregation technology is introduced in the mobile communication system. The embodiments are not limited to it.

Further, in an embodiment, it is assumed as a prerequisite in the description that the user apparatus supports CA up to five CCs (supports CA in which a PCell and four SCells are combined). The embodiments are not limited to the above. An embodiment of the present invention may be applied to a user apparatus capable of supporting CA in which further more CCs are bundled.

<Overall System Configuration>

Figure 8:
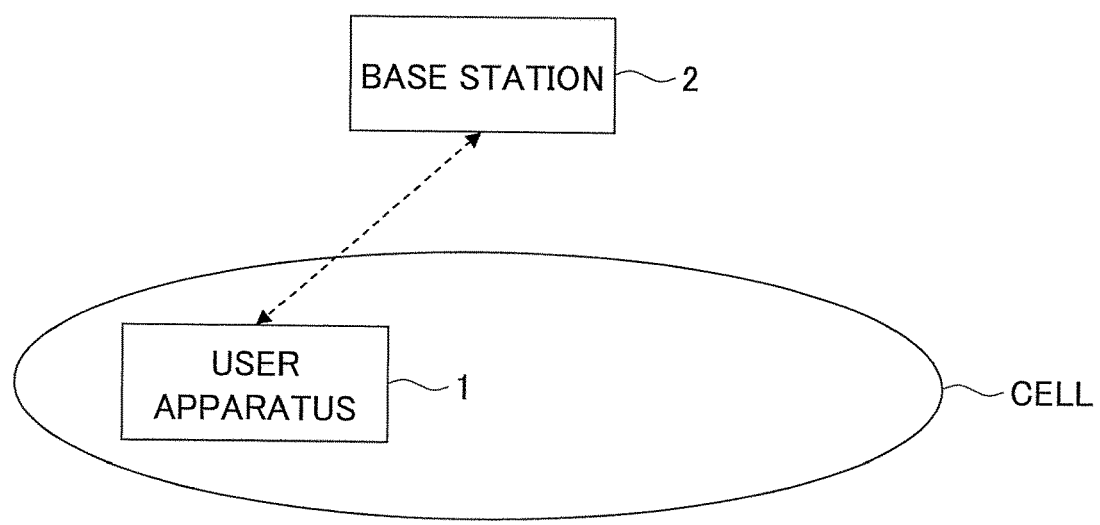
FIG. 8 is a drawing illustrating a structure of a mobile communication system according to an embodiment.

FIG. 8 is a drawing illustrating a structure of a mobile communication system according to an embodiment. As illustrated in FIG. 8, the mobile communication system according to an embodiment includes a user apparatus 1 and a base station 2, and CA communications can be performed between the user apparatus 1 and the base station 2.

Figure 2:
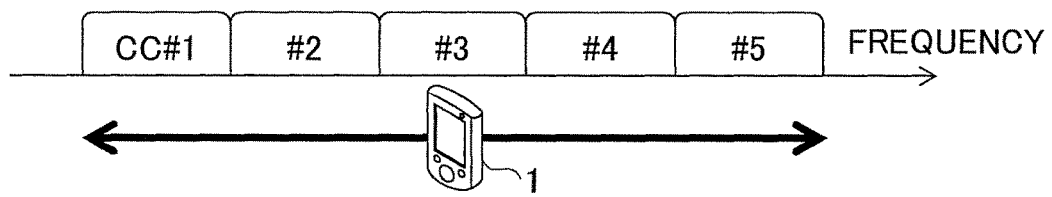
FIG. 2 is a drawing illustrating an example in which CCs are bundled in LTE Rel-10.
Figure 3:
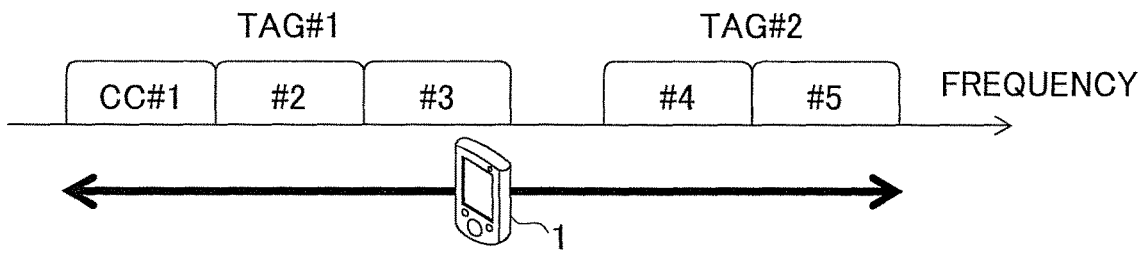
FIG. 3 is a drawing illustrating an example in which CCs are bundled in LTE Rel-11.
Figure 4:
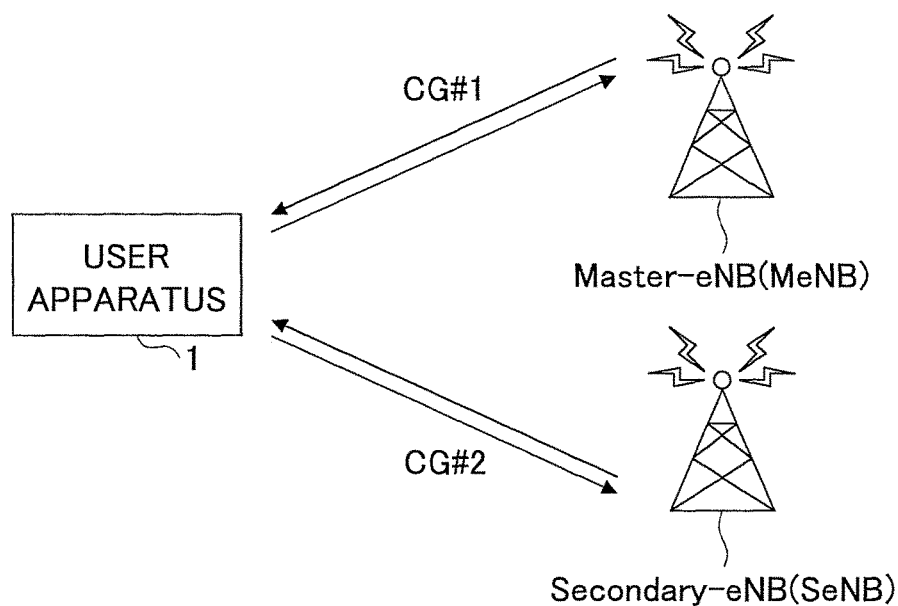
FIG. 4 is a drawing illustrating an example of dual connectivity introduced in Rel-12.
Figure 5:
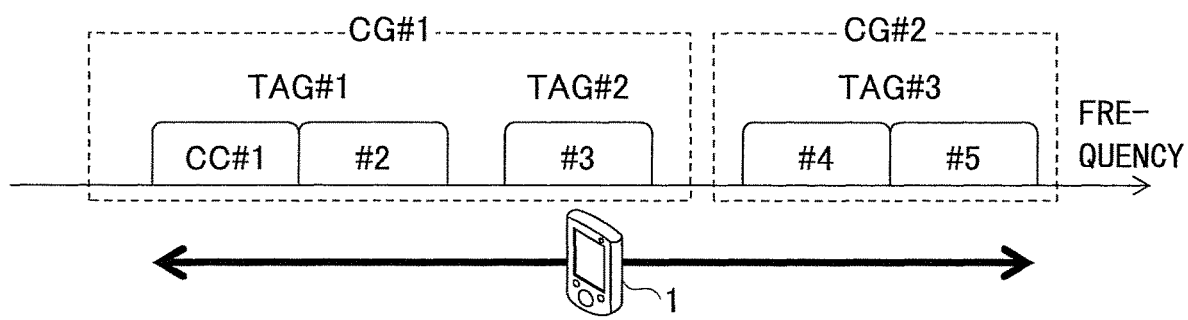
FIG. 5 is a drawing illustrating an example in which CCs are bundled in LTE Rel-12.
Figure 6:
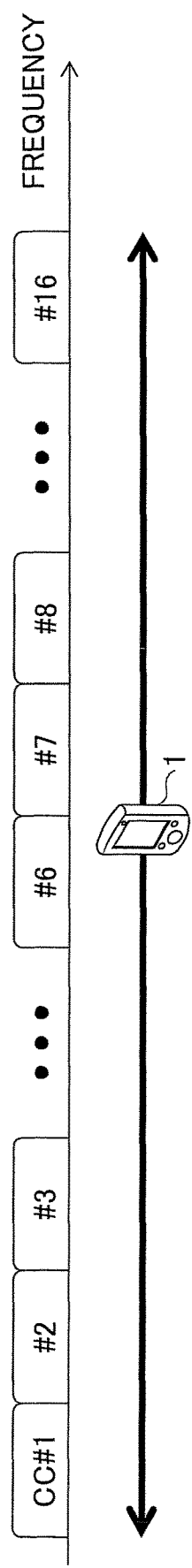
FIG. 6 is a drawing illustrating an example in which CCs are bundled in LTE Rel-13.
Figure 7A:
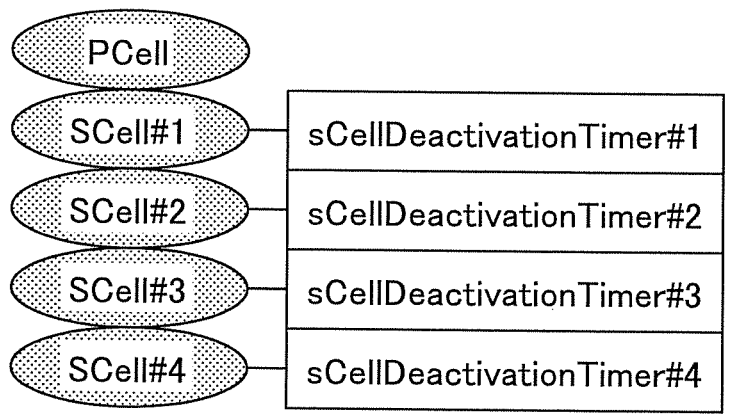
FIG. 7A is a drawing illustrating a problem.
Figure 7B:
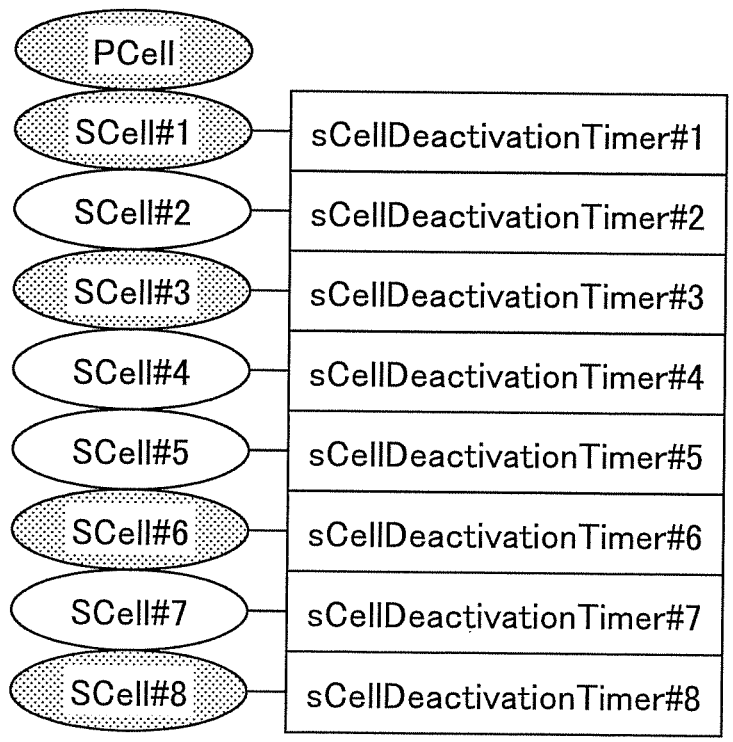
FIG. 7B is a drawing illustrating a problem.
Figure 7C:
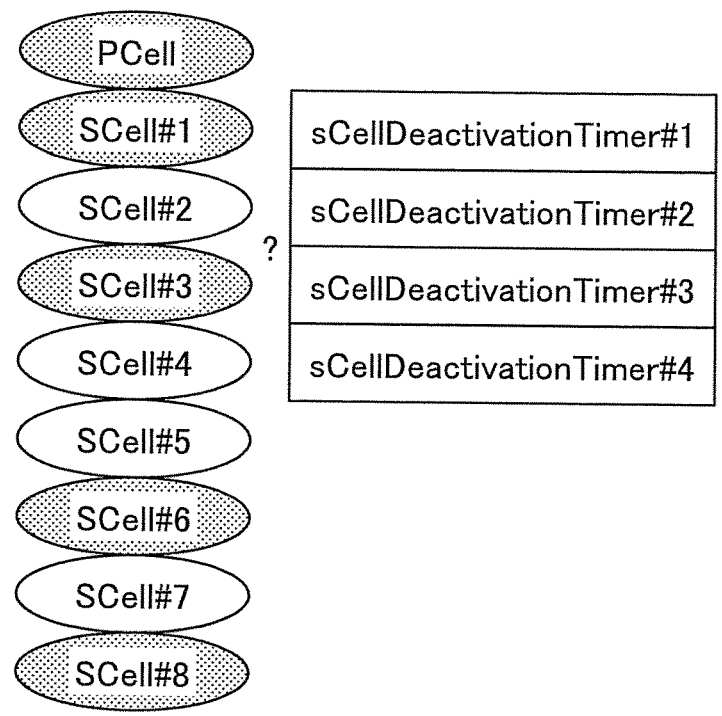
FIG. 7C is a drawing illustrating a problem.

Further, in an example of FIG. 2, a single cell is shown for the sake of convenience. When CA is configured, multiple cells exist. Further, for example, an RRE, located away from the base station 2, connected to the base station 2 via an optical fiber, etc., may be included.

The base station 2 performs communications with the user apparatus 1 via radio. The base station 2 includes hardware resources such as a CPU including a processor, a memory device including a ROM, a RAM, a flash memory, etc., an antenna used for communications with the user apparatus 1, etc., a communication interface device for communicating with an adjacent base station 2, a core network, etc. Functions and processes of the base station 2 may be realized by having the processor processing or executing data or programs stored in the memory device. However, the hardware configuration of the base station 2 is not limited to the above, and the base station 2 may have any other appropriate hardware configuration.

The user apparatus 1 has a function to communicate with the base station 2, the core network, etc., via radio. The user apparatus 1 may be, for example, a mobile phone, a smartphone, a tablet, a mobile router, a wearable terminal, etc. The user apparatus 1 may be any apparatus as long as it has a communication function. The user apparatus 1 includes hardware resources such as a CPU including a processor, a memory device including a ROM, a RAM, a flash memory, etc., an antenna used for communications with the base station 2, a radio frequency (RF) device, etc. Functions and processes of the user apparatus 1 may be realized by having the processor processing or executing data or programs stored in the memory device. However, the hardware configuration of the user apparatus 1 is not limited to the above, and the user apparatus 1 may have any other appropriate hardware configuration.

<Overview>

The mobile communication system according to an embodiment performs grouping the multiple SCells in such a way that the number of CCs is within the number the user apparatus 1 can control simultaneously, and, out of SCells in a group, only one SCell is controlled to be activated.

Figure 9A:
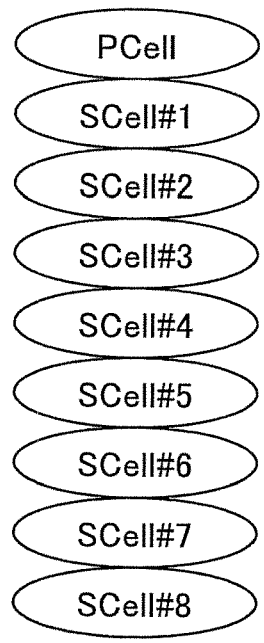
FIG. 9A is a drawing illustrating an example of a method for grouping SCells.
Figure 9B:
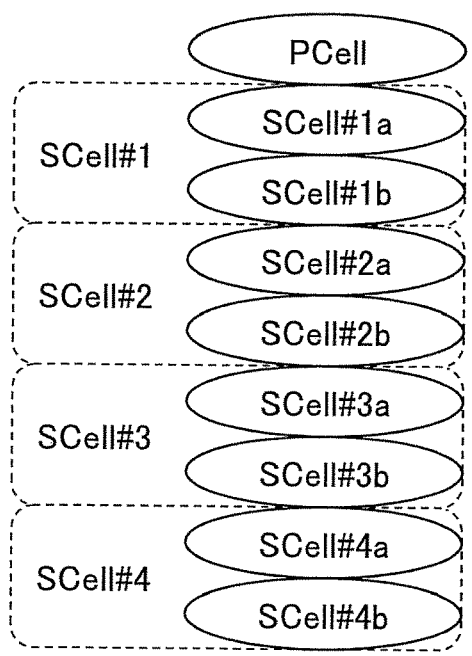
FIG. 9B is a drawing illustrating an example of a method for grouping SCells.

FIGS. 9A and 9B are drawings illustrating an example of a method for grouping SCells. For example, referring to FIG. 9, a method for grouping SCells is described in the case where CA includes a PCell and eight SCells. According to conventional CA, as illustrated in 9A, identifiers such as #1 through #8 are assigned to the eight SCells.

On the other hand, in a mobile communication system according to an embodiment, the eight SCells are grouped into four groups each of which includes two SCells, and two SCells in each group are given the same identifier which is used for identifying cells in a group unit.

In the mobile communication system according to an embodiment, as an identifier for identifying cells in a group unit, for example, the same CellIndex and the same sCellIndex may be given to each of the SCells, or, any one of the same CellIndex and the same sCellIndex may be given to each of the SCells. As described above, by having the identifier identifying cells in a group unit given, it is possible for the user apparatus 1 and the base station 2 to uniquely identify each group by using CellIndex or sCellIndex. It should be noted that, in the following, for the sake of description convenience, it is assumed that "sCellIndex" is given as an identifier for identifying cells in a group unit. However, as described above, "CellIndex" may be given, or both "CellIndex" and "sCellIndex" may be given.

Further, in the mobile communication system according to an embodiment, for SCells included in each of four groups, identifiers for uniquely identifying SCells, respectively, in the same group are given. Such an identifier is referred to as "subCellIndex" in an embodiment.

In FIG. 9B, a state is illustrated in which "sCellIndex" and "subCellIndex" are given to each of the SCells. As illustrated in FIG. 9B, #1 is given as a "sCellIndex" to two SCells which belong to a group SCell #1, and further, #1a and #1b are given as a "subCellIndex" to the corresponding SCells. Further, #2 is assigned as a "sCellIndex" to two SCells which belong to a group SCell #2, and further, #2a and #2b are assigned as a "subCellIndex" to the corresponding SCells. Further, #3 is assigned as a "sCellIndex" to two SCells which belong to a group SCell #3, and further, #3a and #3b are assigned as a "subCellIndex" to the corresponding SCells. Further, #4 is assigned as a "sCellIndex" to two SCells which belong to a group SCell #4, and further, #4a and #4b are assigned as a "subCellIndex" to the corresponding SCells.

It should be noted that the values (#1 through #4) of sCellIndex illustrated in FIG. 9B are given for the sake of description convenience. Any identifier may be used as long as it can uniquely identify each group. Further, the values (#1a through #4b) of subCellIndex illustrated in FIG. 9B are given for the sake of description convenience. Any identifier may be used as long as it can uniquely identify SCells in each group.

Further, in the mobile communication system according to an embodiment, the number of activated SCells of one or more SCells in each group is controlled to be one. In other words, in the case where SCells are grouped into four groups as illustrated in FIG. 9B, the maximum number of simultaneously activated SCells is four.

As described above, by controlling SCells after grouping SCells, it is possible for the mobile communication system according to an embodiment to perform CA in a range of CCs which the user apparatus 1 can control simultaneously even in the case where CA in which many CCs are bundled is performed.

It should be noted that, in the following, each SCell in each group may be referred to as a "subSCell" or a "sub cell". Further, a CC corresponding to a subSCell may be referred to as "subCC".

Figure 10:
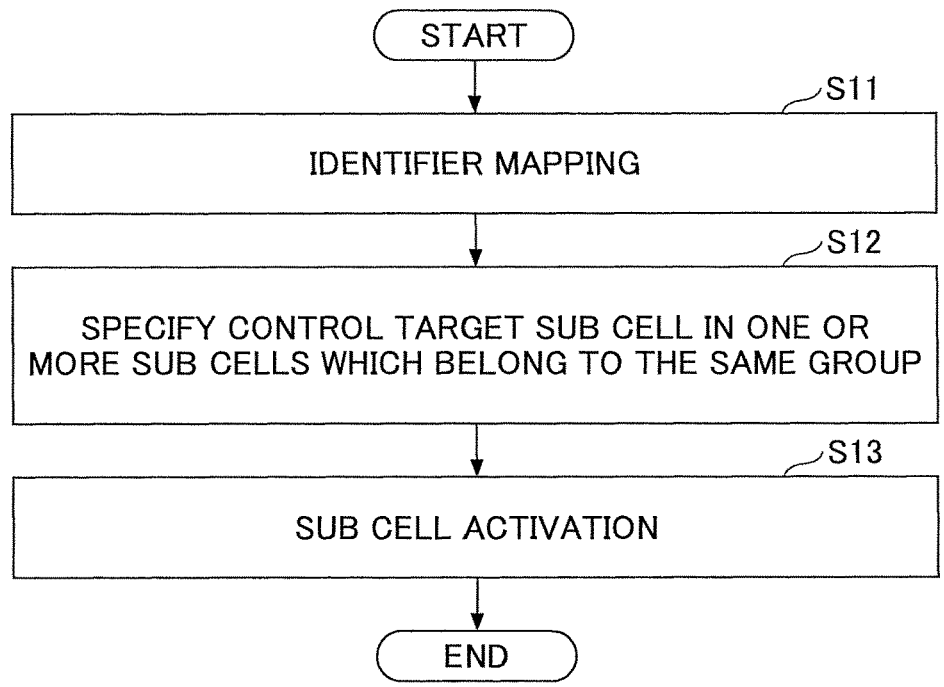
FIG. 10 is a flowchart illustrating an overview of processing steps of the mobile communication system according to an embodiment.

FIG. 10 is a flowchart illustrating an overview of processing steps of the mobile communication system according to an embodiment. Referring to FIG. 10, a method of controlling grouped SCells after the SCells have been grouped by the mobile communication system according to an embodiment will be described.

First, in step S11, when instructing the user apparatus 1 to add an SCell, the base station 2 transmits to the user apparatus 1 sCellIndex and subCellIndex of an SCell which should be added. It is possible for the user apparatus 1 to identify a group to which the SCell belongs according to the sCellIndex, and to uniquely identify the SCell (sub cell) in the group according to the subCellIndex.

In step S12, the base station 2 specifies which of one or more sub cells in the group should be a control target. The user apparatus 1 stores the specified control target sub cell.

In step S13, the base station 2 instructs the user apparatus 1 to activate the sub cell. At this time, the base station 2 specifies the group of the SCell which should be activated. For example, the base station 2 may specify the group of the SCell which should be activated by transmitting sCellIndex to the user apparatus 1 according to a conventional medium access control (MAC) control element (CE) format.

Next, the user apparatus 1 activates a sub cell, in the SCell group specified in step S13, specified as a control target in processing steps of step S12. Further, for the activated sub cell, a control mechanism performed for each SCell including sCellDeactivationTimer notification, channel state information (CSI) notification, and hybrid automatic repeat request (HARQ) control is operated between the user apparatus 1 and the base station 2.

As described above, in the mobile communication system according to an embodiment, which sub cell in the grouped SCells will be a control target is determined in advance according to processing steps in step S11 and step S12. In addition to the above operation, in the mobile communication system according to an embodiment, the cell will be controlled (activated) by specifying the group of the SCells according to processing steps in step S13. As the processing steps in step S13, processing steps defined in the existing LTE specification may be used.

In other words, it can be said that, in the mobile communication system according to an embodiment, the SCell group (also referred to as "the sub cell group") is defined as a virtual SCell, and a conventional control mechanism performed for each SCell is applied to the virtual SCell. With the above operation, in the mobile communication system according to an embodiment, even in the case where CA in which many CCs are bundled is performed, by utilizing existing processing steps, it is possible to perform CA in a range of CCs which the user apparatus 1 can control simultaneously.

<Functional Configuration>
(User Apparatus)

Figure 11:
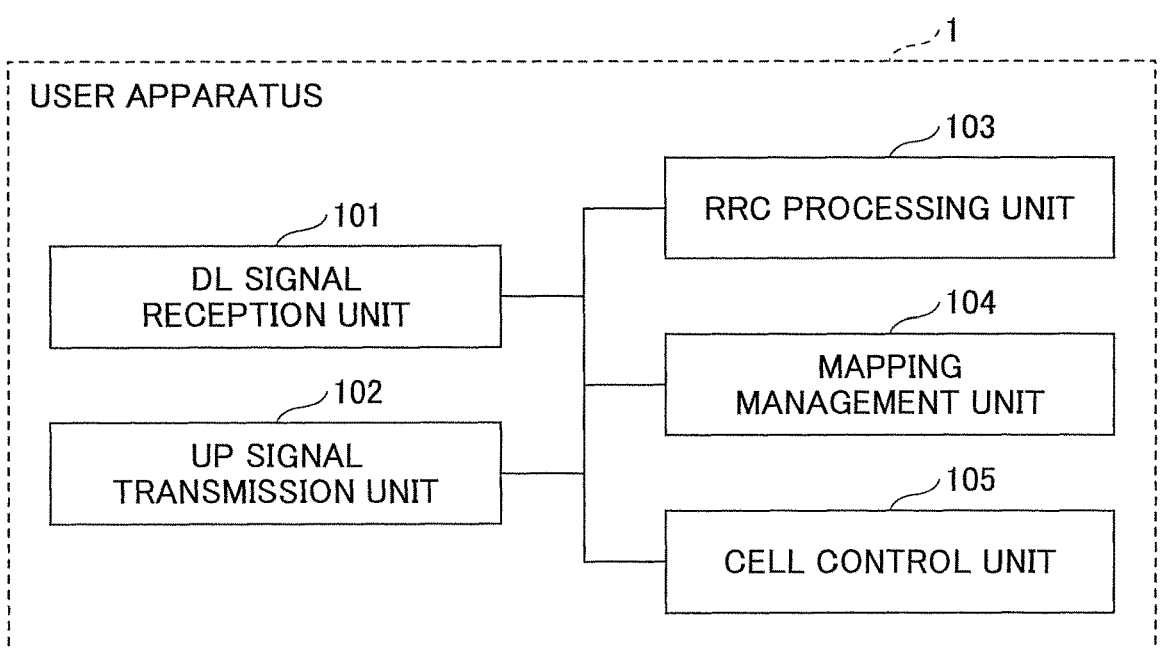
FIG. 11 is a drawing illustrating an example of a functional configuration of a user apparatus according to an embodiment.

FIG. 11 is a drawing illustrating an example of a functional configuration of a user apparatus 1 according to an embodiment. As illustrated in FIG. 11, the user apparatus 1 includes a DL signal reception unit 101, a UL signal transmission unit 102, a radio resource control (RRC) processing unit 103, a mapping management unit 104, and a cell control unit 105. FIG. 11 illustrates functional units of the user apparatus 1 especially related to an embodiment only, and thus, the user apparatus 1 further includes at least functions for performing operations according to LTE (not shown in the figure). Further, a functional structure illustrated in FIG. 11 is only an example. Functional classification and names of functional units may be anything as long as operations related to an embodiment can be performed.

The DL signal reception unit 101 includes a function for wirelessly receiving various kinds of signals from the base station 2, and obtaining upper layer signals from the received physical layer signals. The UL signal transmission unit 102 includes a function for wirelessly transmitting various kinds of physical layer signals generated from an upper layer signal which should be transmitted from the user apparatus 1. Each of the DL signal reception unit 101 and the UL signal transmission unit 102 includes a function for performing CA in which multiple CCs are bundled for communication.

It is assumed that each of the DL signal reception unit 101 and the UL signal transmission unit 102 includes a packet buffer, and performs processes of layer 1 (PHY) and layer 2 (MAC, RLC, PDCP). However, the functional structure is not limited to the above.

The RRC processing unit 103 includes a function for transmitting and receiving an RRC message to and from the base station 2, and performing processes of CA setting/changing/managing, configuration change, etc. The RRC processing unit 103 is a function unit for performing CA setting, and may be referred to as a setting unit. The CA setting performed by the RRC processing unit 103 includes, for example, transmitting information included in the RRC message (CellIndex, sCellIndex, etc.,) to the mapping management unit 104.

The mapping management unit 104 stores and maintains mapping information in a storage unit including a memory, etc., which mapping information includes sCellIndex and subCellIndex assigned to each of the one or more sub cells included in each of the SCell groups, and information indicating which sub cell is a control target in the one or more sub cells included in each of the SCell groups. When CC addition/removal is performed for CA, the mapping management unit 104 performs processes of creating/updating the mapping information, etc., based on control information (RRC signal and MAC CE) transmitted from the base station 2.

The cell control unit 105 receives a notification for specifying a control target sub cell from the base station 2, and transmits the notification to the mapping management unit 104. Further, the cell control unit 105 activates (or deactivates) a sub cell according to an activation (or deactivation) command specifying a specific SCell group according to MAC CE. The cell control unit 105 determines which sub cell should be activated or deactivated based on the mapping information.

Further, the cell control unit 105 transmits various types of information items related to sub cells (e.g., quality information (CQI), a power margin, a buffer status, etc.,) to the base station 2.

It should be noted that, in the user apparatus 1, activating a cell (or a sub cell) means, for example, instructing the DL signal receiving unit 101 and/or the UL signal transmission unit 102 to perform communications by using CCs (or subCCs) included in the cell (or the sub cell) (e.g., perform PDCCH, PDSCH reception), and storing information indicating that the cell (or the sub cell) has been activated in a storage unit, etc. Deactivating a cell (or a sub cell) means, for example, instructing the DL signal receiving unit 101 and/or the UL signal transmission unit 102 to stop performing communications by using CCs (or subCCs) included in the cell (or the sub cell) and storing information indicating that the cell (or the sub cell) has been deactivated in a storage unit, etc.

Figures 12, 13:
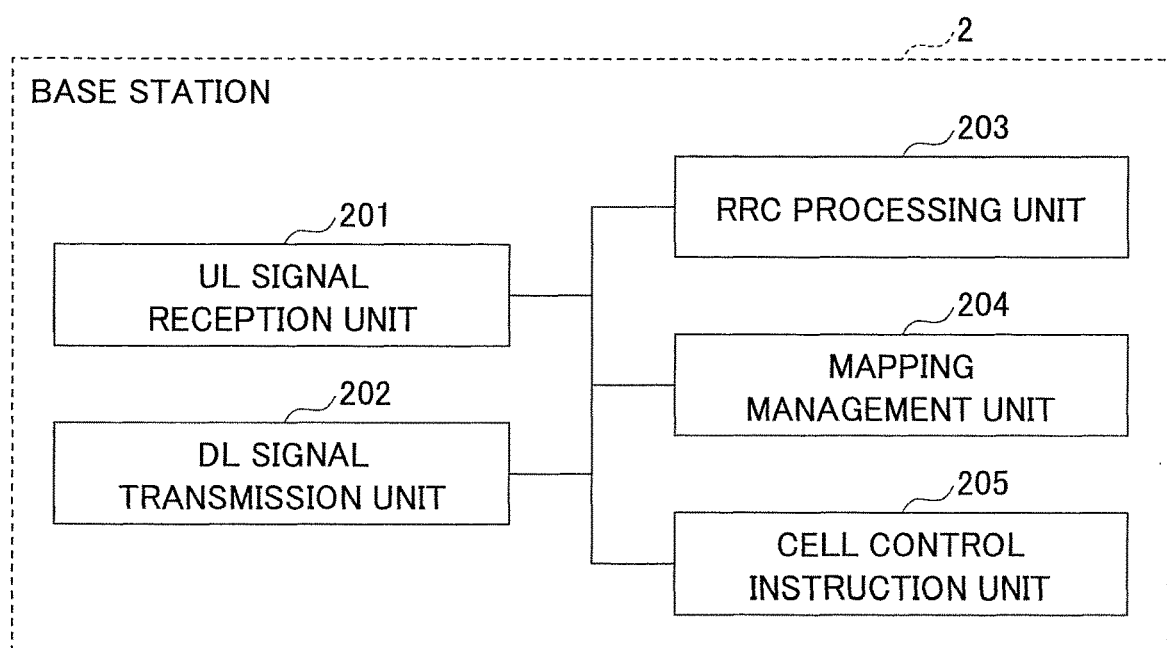
FIG. 12 is a drawing illustrating an example of mapping information.
FIG. 13 is a drawing illustrating an example of a functional configuration of a base station according to an embodiment.

FIG. 12 is a drawing illustrating an example of the mapping information. The mapping information includes an SCellIndex column, a subCellIndex column, and a control target sub cell column, and includes a record for each sub cell.

In the sCellIndex column, an SCellIndex assigned to the sub cell is stored. In the sCellIndex column, a subCellIndex assigned to the sub cell is stored. In the control target sub cell column, information indicating which sub cell is a control target, out of the sub cells to which the same sCellIndex is assigned, is stored. In the control target sub cell column, "TRUE" is set for the control target sub cell, and "FALSE" is set for the non-control-target sub cell. Further, in the case where the control target sub cell has not been determined, "NA" is set.

In the multiple sub cells to which the same sCellIndex is assigned, the number of sub cells for which "TRUE" is set is one. Further, in the case where the control target sub cell has not been determined, "NA" is set for each of the one or more sub cells to which the same sCellIndex is assigned. For example, in mapping information illustrated in FIG. 12, for two sub cells for which "4" is set in the sCellIndex column (cells for which "4a" and "4b" are set in the subCellIndex column), "NA" is set in the control target sub cell column. The above mapping information indicates a state in which the control target sub cell has not been specified by the base station 2 for the SCell group whose sCellIndex is "4".

(Base Station)

FIG. 13 is a drawing illustrating an example of a functional configuration of a base station according to an embodiment. As illustrated in FIG. 13, the base station 2 includes a UL signal reception unit 201, a DL signal transmission unit 202, a RRC processing unit 203, a mapping management unit 204, and a cell control instruction unit 205. FIG. 13 illustrates functional units of the base station 2 especially related to an embodiment only, and thus, the base station 2 further includes at least functions for performing operations according to LTE (not shown in the figure). Further, a functional structure illustrated in FIG. 13 is only an example. Functional classification and names of functional units may be anything as long as operations related to an embodiment can be performed.

The UL signal reception unit 201 includes a function for wirelessly receiving various kinds of signals from the user apparatuses 1, and obtaining upper layer signals from the received physical layer signals. The DL signal transmission unit 202 includes a function for wirelessly transmitting various kinds of physical layer signals generated from an upper layer signal which should be transmitted from the base station 2. Each of the UL signal reception unit 201 and the DL signal transmission unit 202 includes a function for performing CA in which multiple CCs are bundled for communications. Further, similar to the RRE, the UL signal reception unit 201 and the DL signal transmission unit 202 may be a radio communication unit located remotely from the body (control unit) of the base station 2.

It is assumed that each of the UL signal reception unit 201 and the DL signal transmission unit 202 includes a packet buffer, and performs processes of layer 1 (PHY) and layer 2 (MAC, RLC, PDCP). However, the functional structure is not limited to the above.

The RRC management unit 203 includes a function for transmitting and receiving an RRC signal to and from the user apparatus 1, and performing processes of CA setting/changing/managing, configuration change, etc. The RRC processing unit 203 is a function unit for performing CA setting, and may be referred to as a setting unit.

The mapping management unit 204 maintains sCellIndex and subCellIndex assigned to each of the one or more sub cells included in each of the SCell groups, and information indicating which sub cell is a control target in the one or more sub cells included in each of the SCell groups, which have been transmitted to the user apparatus 1. The mapping management unit 204 may maintain the mapping information illustrated in FIG. 12 by, for example, storing the mapping information in a storage unit such as a memory, etc.

The cell control instruction unit 205 transmits the control target sub cell information to the user apparatus 1 based on the information maintained by the mapping management unit 204, and controls the user apparatus 1 to activate (or deactivate) the sub cell by using an activation (or deactivation) command indicating the specific SCell group by MAC CE.

The above-described functional structures of the user apparatus 1 and the base station 2 may be entirely realized by a hardware circuit (e.g., one or more IC chips), or may be partially realized by a hardware circuit and the remaining part may be realized by a CPU and programs.

(User Apparatus)

Figure 14:
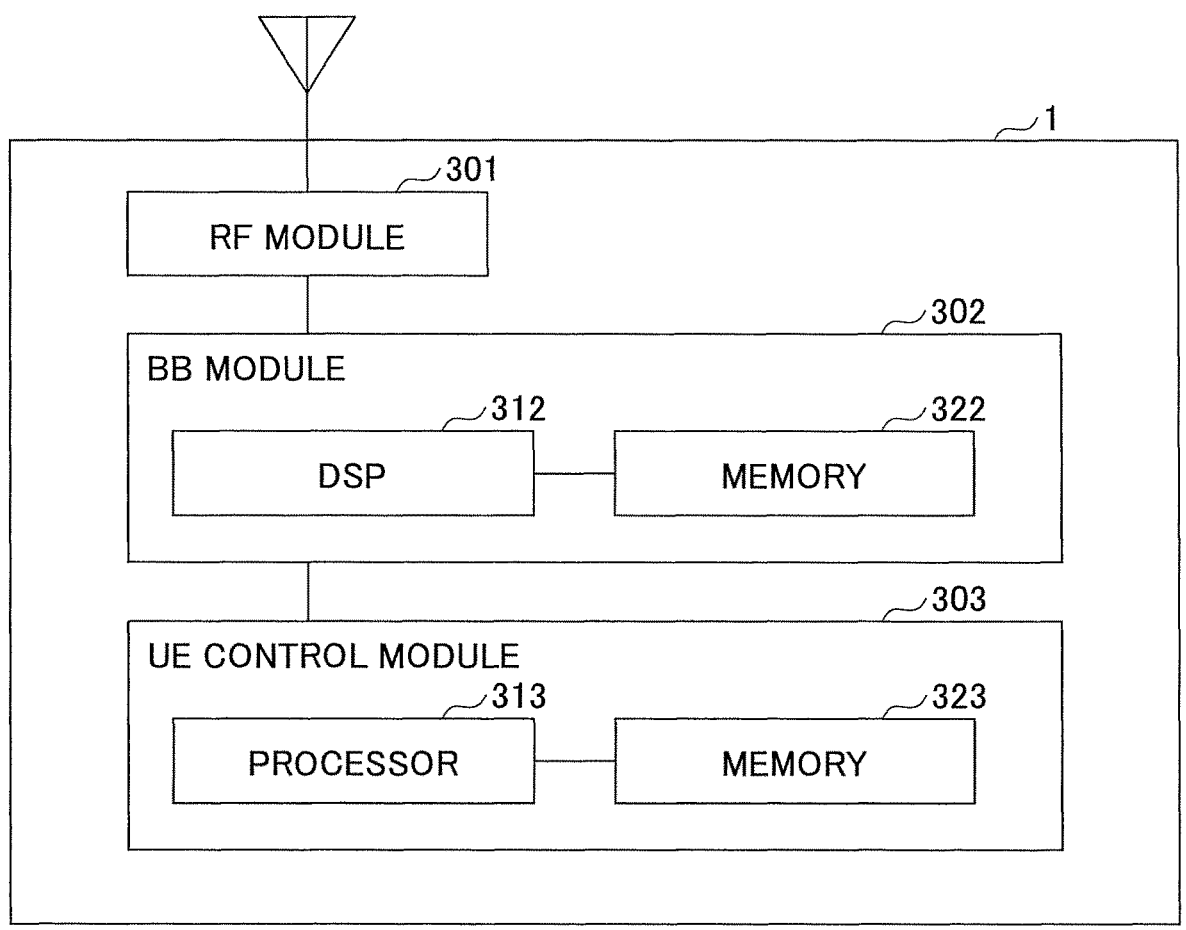
FIG. 14 is a drawing illustrating an example of a hardware configuration of a user apparatus according to an embodiment.

FIG. 14 is a drawing illustrating an example of a hardware configuration of a user apparatus 1 according to an embodiment. FIG. 14 illustrates a structure closer to an implementation example compared to FIG. 11. As illustrated in FIG. 14, the user apparatus 1 includes a radio frequency (RF) module 301 for performing a process related to a wireless signal, a baseband (BB) processing module 302 for performing a baseband signal process, and a UE control module 303 for performing a process of an upper layer, etc.

The RF module 301 generates a radio signal to be transmitted from an antenna by performing digital-to-analog (D/A) conversion, modulation, frequency conversion, power amplification, etc., for a digital baseband signal received from the BB processing module 302. Further, the RF module 161 generates a digital baseband signal by performing frequency conversion, analog to digital (A/D) conversion, demodulation, etc., for a received radio signal, and transmits the generated signal to the BB processing module 302. The RF module 301 includes, for example, a part of the DL signal reception unit 101 and a part of the UL signal transmission unit 102 illustrated in FIG. 11.

The BB processing module 302 performs a process of converting bidirectionally between an IP packet and a digital baseband signal. A digital signal processor (DSP) 312 is a processor for performing signal processing in the BB processing module 302. A memory 322 is used as a work area of the DSP 312. The BB processing module 302 includes, for example, a part of the DL signal reception unit 101, a part of the UL signal transmission unit 102, a part of the mapping management unit 104, and a part of the cell control unit 105 illustrated in FIG. 11.

The UE control module 303 performs an IP layer protocol process, processes of various types of applications, etc. A processor 313 performs a process for the UE control module 303. A memory 323 is used as a work area of the processor 313. The UE control module 303 includes, for example, a part of the RRC processing unit 103, a part of the mapping management unit 104, and a part of the cell control unit 105 illustrated in FIG. 11.

(Base Station)

Figure 15:
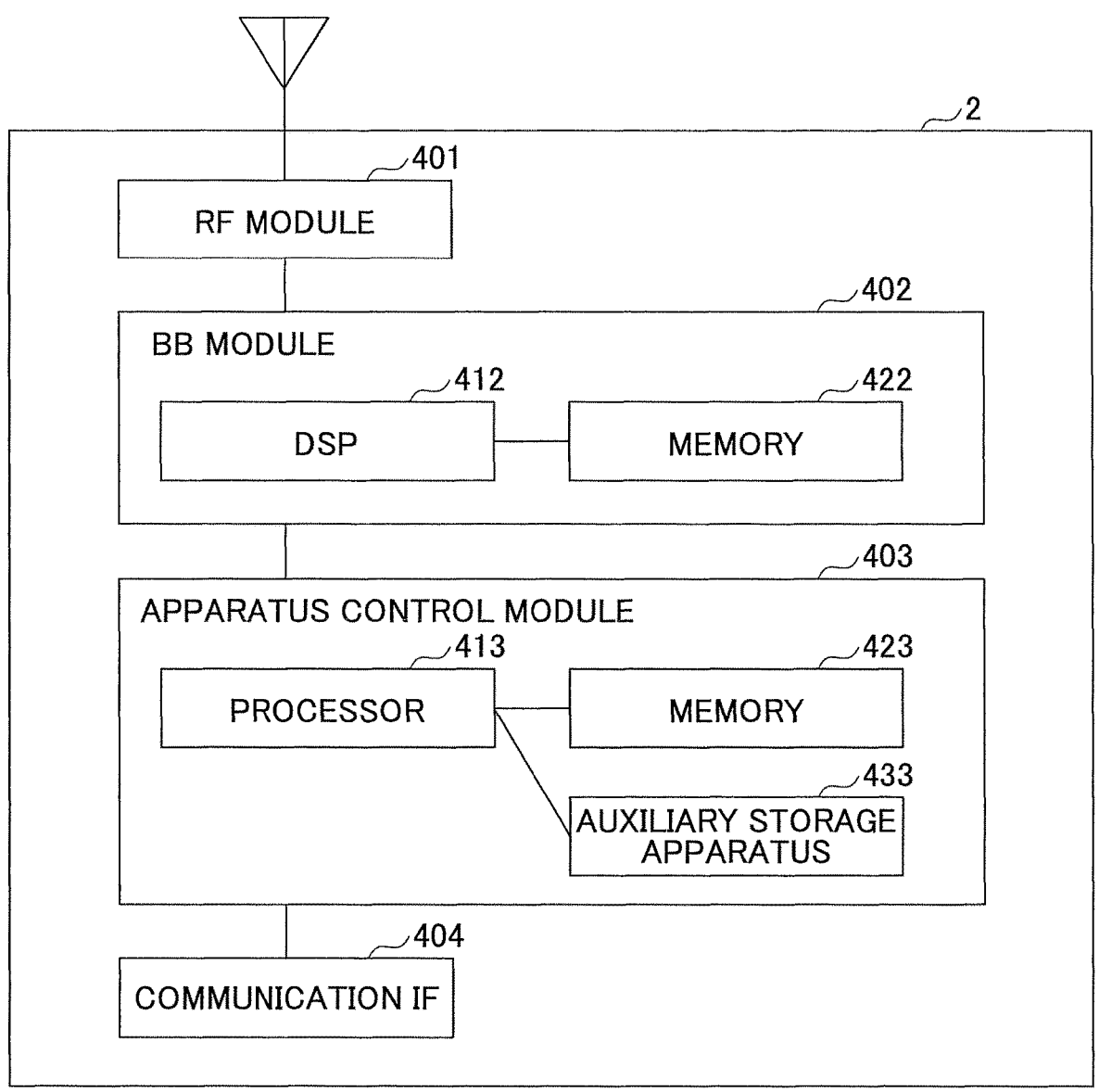
FIG. 15 is a drawing illustrating an example of a hardware configuration of a base station according to an embodiment.

FIG. 15 is a drawing illustrating an example of a hardware configuration of a base station 2 according to an embodiment. FIG. 15 illustrates a structure closer to an implementation example compared to FIG. 13. As illustrated in FIG. 15, the base station 2 includes an RF module 401 for performing a process related to a wireless signal, a BB processing module 402 for performing a baseband signal process, an apparatus control module 403 for performing a process of an upper layer, etc., and a communication IF 404 as an interface for connecting to a network.

The RF module 401 generates a radio signal to be transmitted from an antenna by performing D/A conversion, modulation, frequency conversion, power amplification, etc., for a digital baseband signal received from the BB processing module 402. Further, the RF module 401 generates a digital baseband signal by performing frequency conversion, A/D conversion, demodulation, etc., for a received radio signal, and transmits the generated signal to the BB processing module 402. The RF module 401 includes, for example, a part of the UL signal reception unit 201 and a part of the DL signal transmission unit 202 illustrated in FIG. 13.

The BB processing module 402 performs a process of converting bidirectionally between an IP packet and a digital baseband signal. DSP 412 is a processor for performing signal processing in the BB processing module 402. A memory 422 is used as a work area of the DSP 412. The BB processing module 402 includes, for example, a part of the UL signal reception unit 201, a part of the DL signal transmission unit 202, a part of the mapping management unit 204, and a part of the cell control unit 205 illustrated in FIG. 13.

The apparatus control module 403 performs an IP layer protocol process, an operation and maintenance (OAM) process, etc. A processor 413 performs a process for the apparatus control module 403. A memory 423 is used as a work area of the processor 413. An auxiliary storage apparatus 433 is, for example, a HDD, etc., and stores various types of setting information items, etc., used for operations of the base station 2. The apparatus control module 403 includes, for example, the RRC control unit 203, a part of the mapping management unit 204, and a part of the cell control instruction unit 205 illustrated in FIG. 13.

<Processing Steps>

Next, processing steps performed by a mobile communication system according to an embodiment will be described. It should be noted that, in the following description, it is assumed that the user apparatus 1 and the base station 2 identify the SCell group by using sCellIndex, but the SCell group may be identified by using CellIndex instead of sCellIndex. Further, the SCell group may be identified by using sCellIndex and CellIndex.

(Cell Addition Process in CA)

Figure 16:
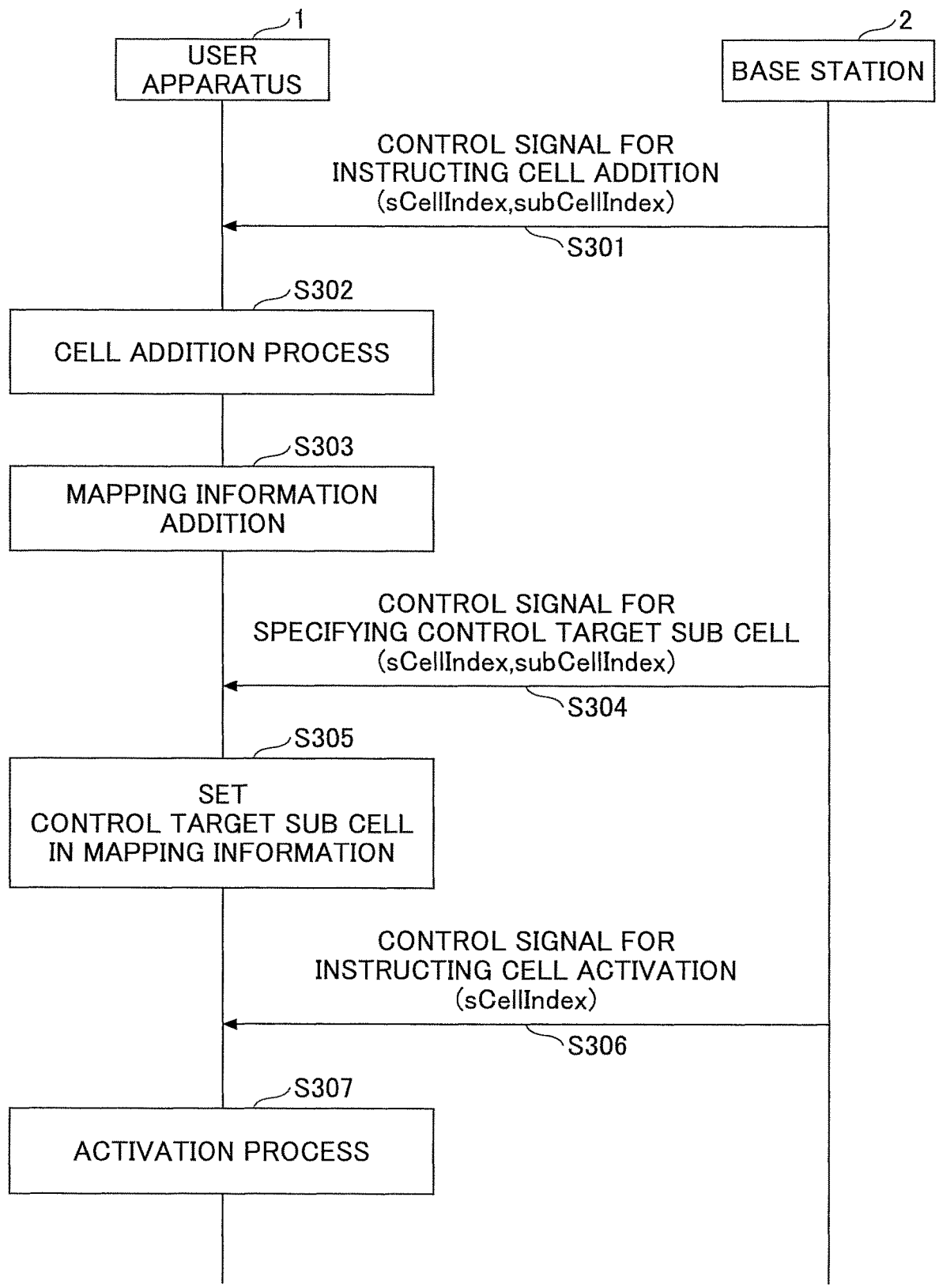
FIG. 16 is a sequence diagram illustrating an example of processing steps (cell addition process) according to an embodiment.

FIG. 16 is a sequence diagram illustrating an example of processing steps (cell addition process) according to an embodiment. Referring to FIG. 16, a series of processing steps will be described from after CA start is indicated by the base station 2 to the user apparatus 1 to when added cell (sub cell) is activated in a mobile communication system according to an embodiment.

In step S301, the RRC processing unit 203 of the base station 2 transmits a control signal for instructing the user apparatus 1 to add a cell. In the control signal, sCellIndex and subCellIndex of an SCell which is going to be added are included. Further, in the control signal, various types of setting information items (a bandwidth, information related to a physical channel configuration, TDD configuration information, etc.,) are included. It should be noted that the RRC processing unit 203 of the base station 2 may instruct the user apparatus 1 to add multiple cells by using the control signal. The control signal is, for example, an RRC connection reconfiguration signal.

It should be noted that, in the case where the RRC processing unit 203 of the base station 2 is going to add a new sub cell to the same SCell group, the RRC processing unit 203 of the base station 2 may transmit to the user apparatus 1 the various types of setting information items (e.g., bandwidth, information related to a physical channel configuration, TDD configuration information, etc.,) related to the added cell in which the setting information items which are the same as the sub cell added in the past are omitted. With the above operations, it is possible for the mobile communication system according to an embodiment to reduce the signal amount of the control signals communicated between the user apparatus 1 and the base station 2.

In step S302, the RRC processing unit 103 of the user apparatus 1 performs a process for adding the cell indicated in the processing steps of step S301. It should be noted that, in the case where the user apparatus 1 is instructed to add a new sub cell to the same SCell group, the RRC processing unit 103 of the user apparatus 1 may refer to the setting information items that have already been set for the sub cells in the same SCell group to obtain setting information items that have not been transmitted from the base station in the processing steps of step S301, of setting information items related to the added cell (bandwidth, physical channel configuration, TDD configuration, etc.) With the above operations, it is possible for the mobile communication system according to an embodiment to reduce the signal amount of the control signals communicated between the user apparatus 1 and the base station 2.

In step S303, the mapping management unit 104 of the user apparatus 1 adds a new record to the mapping information, which record includes sCellIndex and subCellIndex indicated in the processing steps of step S301. It should be noted that, at this time, "NA" is set in the "control target sub cell" column of the record.

In step S304, the cell control unit 205 of the base station 2 transmits a control signal for specifying the control target sub cell to the user apparatus 1. As the control signal, for example, a MAC signal command may be used, or control information of a physical channel including a PDCCH, etc., (DCI) may be used.

Figure 17:
FIG. 17 is a drawing illustrating an example of a command format.

FIG. 17 is a drawing illustrating an example of a command format. In the command illustrated in FIG. 17, sCellIndex and subCellIndex are included. It is possible for the user apparatus 1 to uniquely identify the control target sub cell according to sCellIndex and subCellIndex included in the command. It should be noted that the cell control instruction unit 205 of the base station 2 may specify multiple control target sub cells at the same time. In this case, the cell control instruction unit 205 of the base station 2 may transmit to the user apparatus 1 a control signal which includes multiple commands illustrated in FIG. 17. The command format illustrated in FIG. 17 is only an example, and another format may be used. Further, the format illustrated in FIG. 17 may be used for the control information of a physical channel including a PDCCH, etc., (DCI). Returning to FIG. 16, the description will be continued.

In step S305, the mapping management unit 104 of the user apparatus 1 sets "TRUE" in the "control target sub cell" column of the sub cell specified in step S304 in the mapping information. Further, in the case where an SCell (sub cell) exists for which SCell the same sCellIndex as the sub cell specified in step S304 is set, "FALSE" is set in the "control target sub cell" column of the existing SCell (sub cell).

In step S306, the cell control instruction unit 205 of the base station 2 transmits a control signal for indicating cell activation to the user apparatus 1. In the control signal, sCellIndex is included. As the control signal, for example, a MAC signal command may be used, or control information of a physical channel including a PDCCH, etc., (DCI) may be used. In the case of the MAC signal command, an existing MAC signal command (Activation/Deactivation MAC Control Element) defined in the LTE specification may be used as is. It should be noted that the cell control instruction unit 205 of the base station 2 may instruct the user apparatus 1 to activate multiple cells together in the processing steps of step S306.

In step S307, the cell control unit 105 of the user apparatus 1 searches the records of the mapping information for a record which includes sCellIndex specified in step S306. Subsequently, the cell control unit 105 of the user apparatus 1 selects a sub cell whose "control target sub cell" column is "TRUE" from the sub cells corresponding to the searched records, and activates the selected sub cell.

It should be noted that in the case where a sub cell whose "control target sub cell" column is "TRUE" does not exist in the sub cells corresponding to the searched records (in other words, in the case where all of the sub cells corresponding to the searched records have "NA" in the "control target sub cell" column), the cell control unit 105 of the user apparatus 1 may determine that the control signal specifying the control target sub cell has not been received from the base station 2, and may activate any one of the sub cells corresponding to the searched records. Further, in this case, the cell control unit 105 of the user apparatus 1 may activate a sub cell whose frequency band is the lowest (or highest), may activate a sub cell based on the order of the sub cells which has been indicated by the base station 2 in the processing steps of step S301 (for example, activate a sub cell whose addition time (date and time) is the oldest (or the newest)), or may transmit error information indicating that there is no activation-available sub cell to the base station 2.

Now, a series of processing steps have been described above from after CA start is indicated by the base station 2 to the user apparatus 1 to when an added cell (sub cell) is activated in a mobile communication system according to an embodiment. A part of the processing steps illustrated in FIG. 16 may be omitted.

For example, in the case where a first sub cell is added to a predetermined SCell group in the processing steps of step S301, the base station 2 may skip the processing steps of step S304, and may specify sCellIndex of the predetermined SCell group to activate the sub cell in the processing steps of step S306. The above operation is possible because, in the case where there is only one sub cell in a predetermined SCell group, it is possible for the user apparatus 1 to uniquely identify the control target sub cell without having the processing steps of step S304 performed.

Further, in a mobile communication system according to an embodiment, in the case where the base station 2 specifies a control target sub cell, a downlink CC and an uplink CC may be specified separately. For example, in the case where each of the two or more sub cells included in the predetermined SCell has both a downlink subCC and an uplink subCC, the cell control instruction unit 205 of the base station 2 may transmit to the user apparatus 1 a control signal capable of separately specifying the downlink subCC and the uplink subCC in the processing steps of step S304. In this case, the mapping management unit 104 of the user apparatus 1 may have the "control target sub cell" column for downlink subCC and the "control target sub cell" column for uplink subCC, respectively, in the mapping information. With the above arrangement, in a mobile communication system according to an embodiment, it is possible to improve throughput by using an appropriate subCC for downlink and an appropriate subCC for uplink at the time of specifying subCC.

(Processing Steps Related to Control Target Sub Cell Change)

Figure 18:
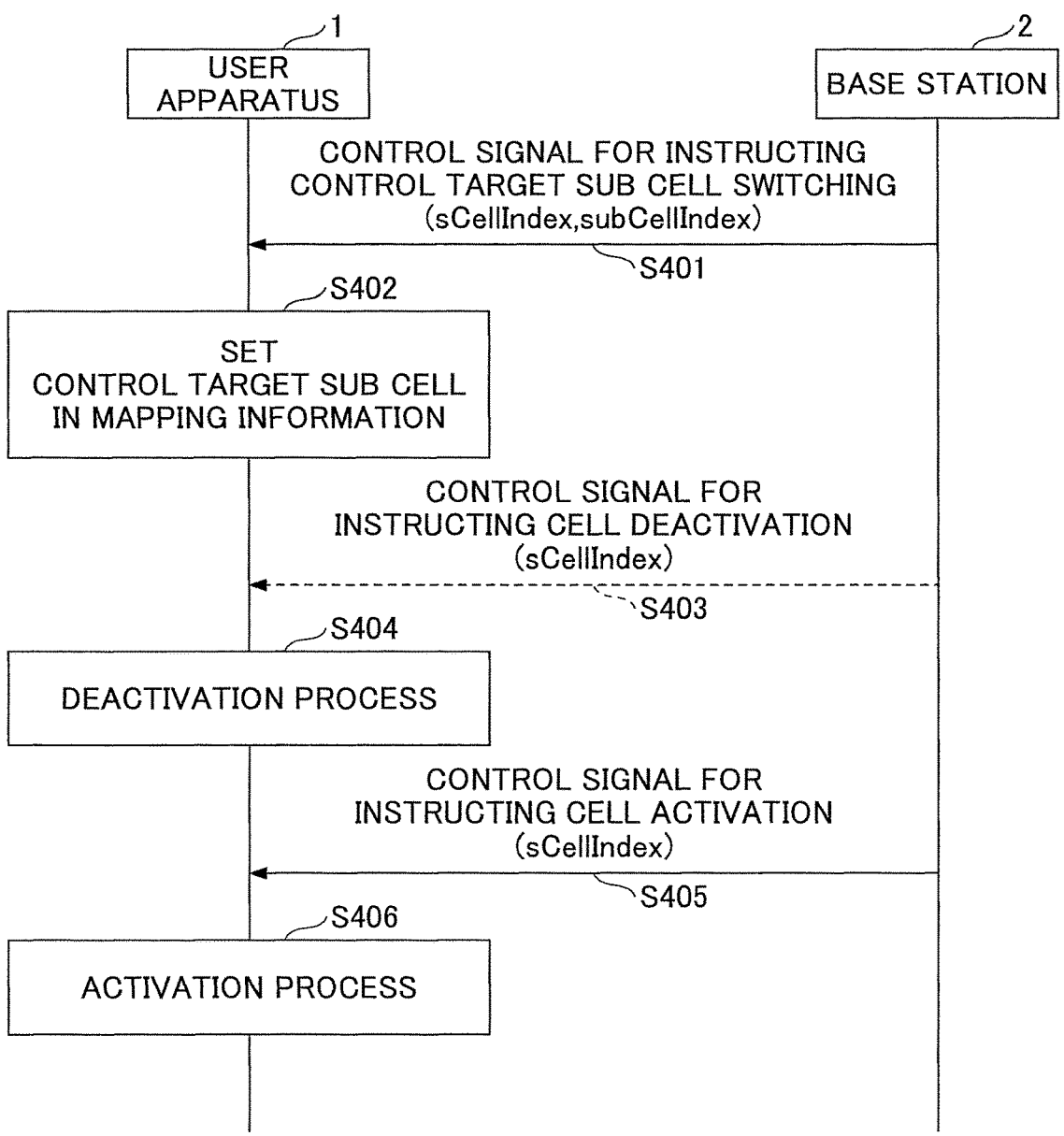
FIG. 18 is a sequence diagram illustrating an example of processing steps (changing control target sub cell) according to an embodiment.

FIG. 18 is a sequence diagram illustrating an example of processing steps (changing the control target sub cell) according to an embodiment. Referring to FIG. 18, processing steps will be described in the case where the control target sub cell is changed in the predetermined SCell group in a mobile communication system according to an embodiment.

In step S401, the cell control instruction unit 205 of the base station 2 transmits a control signal for switching the control target sub cell to the user apparatus 1. In the control signal, sCellIndex and subCellIndex are included. As the control signal, for example, a MAC signal command may be used, or control information of a physical channel including a PDCCH, etc., (DCI) may be used. Further, a format illustrated in FIG. 17 may be used for the MAC signal command or the control information of a physical channel. It should be noted that the cell control instruction unit 205 of the base station 2 may instruct the user apparatus 1 to switch multiple control target sub cells at the same time.

In step S402, the mapping management unit 104 of the user apparatus 1 sets "TRUE" in the "control target sub cell" column of the sub cells specified in step S401 in the mapping information. Further, in the mapping information, the mapping management unit 104 of the user apparatus 1 sets "FALSE" in the "control target sub cell" column of other SCells (sub cells) for which the same sCellIndex as the sub cell specified in step S401 is set.

In step S403, the cell control instruction unit 205 of the base station 2 transmits a control signal for indicating cell deactivation to the user apparatus 1. In the control signal, sCellIndex is included. As the control signal, for example, a MAC signal command may be used, or control information of a physical channel including a PDCCH, etc., (DCI) may be used. In the case of the MAC signal command, an existing MAC signal command (Activation/Deactivation MAC Control Element) defined in the LTE specification may be used as is. It should be noted that the cell control instruction unit 205 of the base station 2 may instruct the user apparatus 1 to deactivate multiple cells together. It should be noted that cell deactivation may not be instructed by the base station 2, but the user apparatus 1 by itself may perform cell deactivation when the user apparatus 1 receives the signal of step S401. With the above operations, in the case of switching the control target sub cell, processing steps of step S403 can be omitted.

In step S404, the cell control unit 105 of the user apparatus 1 searches the records of the mapping information for a record which includes sCellIndex specified in step S403. Subsequently, the cell control unit 105 of the user apparatus 1 selects a sub cell whose "control target sub cell" column is "TRUE" from the sub cells corresponding to the searched records, and deactivates the selected sub cell. It should be noted that, in the case of switching control target sub cell, by deactivating the sub cell for a while, it is possible to reliably avoid transmission and reception during an uncertain period related to RF switching in the user apparatus 1 (a period during which availability of transmission and reception is uncertain), to avoid unnecessary radiation inside and outside the cell, and to avoid wasting resources.

The processing steps of step S405 and step S406 are the same as those of step S306 and step S307, respectively, and thus, the description is omitted. It should be noted that, in the processing steps of step S406, the cell control unit of the user apparatus 1 may reuse the settings (e.g., resource settings for reporting CSI) of the sub cell which has been activated before switching the control target sub cell.

Further, as described above, at the time of sub cell switching, it is assumed that the sub cell is deactivated for a while. However, if a sub cell is deactivated for a while, then control delay occurs before the sub cell is activated again. Therefore, in a mobile communication system according to an embodiment, the sub cell may be switched while keeping the sub cell activated. That is, in the case where a sub cell switching instruction is received for a sub cell which has been activated, the cell control unit 105 of the user apparatus 1 performs the sub cell switching without deactivating the sub cell.

At this time, the cell control unit 105 of the user apparatus 1 may perform the sub cell switching right after the sub cell switching instruction is received from the base station 2, or, may perform the sub cell switching after an elapse of a predetermined period from the sub cell switching instruction reception. The above operation is for not disturbing transmission and reception processing of the sub cell during the switching period by determining the sub cell switching timing in advance. It should be noted that, by having the base station 2 knowing in advance a disturbance receiving period in which the transmission and reception processing will be disturbed, it is possible for the base station 2 to allocate radio resources avoiding the period. Therefore, the cell control instruction unit 205 of the base station 2 may transmit to the user apparatus 1 a sub cell switching timing and a predetermined period before the sub cell switching is to be performed.

Further, in order to have the base station 2 know accurately the sub cell switching timing of the user apparatus 1, the cell control unit 105 of the user apparatus 1 may transmit a switching complete report to the base station 2 according to the completion of the sub cell switching. The cell control unit 105 of the user apparatus 1 may transmit the switching complete report to the base station 2 by using an uplink physical channel, a MAC signal, etc., or may transmit information indicating a situation of the sub cells at the time of sub cell switching completion to the base station 2 by using, for example, a MAC signal.

Further, during a period in which the sub cell switching process is performed, it is assumed that the user apparatus 1 performs quality information reporting (CQI reporting) of the sub cell during the switching. In this case, it is expected that accurate quality measurement cannot be performed, and thus, the cell control unit 105 of the user apparatus 1 may transmit to the base station 2 a value less than a predetermined value, or an out-of-range value as the quality information of the sub cell during the switching.

Further, in the case of switching the sub cell while keeping the sub cell activated, the cell control unit 105 of the user apparatus 1 may transmit to the base station 2 a power margin report of the sub cell after the switching. The above operation is for allowing the base station 2 to determine instantaneously quality of the sub cell after the switching by having the user apparatus 1 transmit the power margin report according to the completion of the sub cell switching, because there is a possibility that the quality changes between the sub cells before and after the switching. It should be noted that, in this case, if necessary, resources for the power margin report may be allocated automatically by the base station 2. Further, the cell control unit 105 of the user apparatus 1 may send a request to the base station 2 for a UL grant for the power margin report. Further, the cell control unit 105 of the user apparatus 1 may also report the current buffer status to the base station 2. In this case, the cell control unit 105 may report the buffer status of the entire user apparatus 1 to the base station 2, or may report the buffer status only related to a bearer or a logical channel associated with the sub cell to the base station 2.

Next, referring to FIG. 18 and FIG. 19, an operation example in the case where the control target sub cell is changed will be described.

Figure 19A:
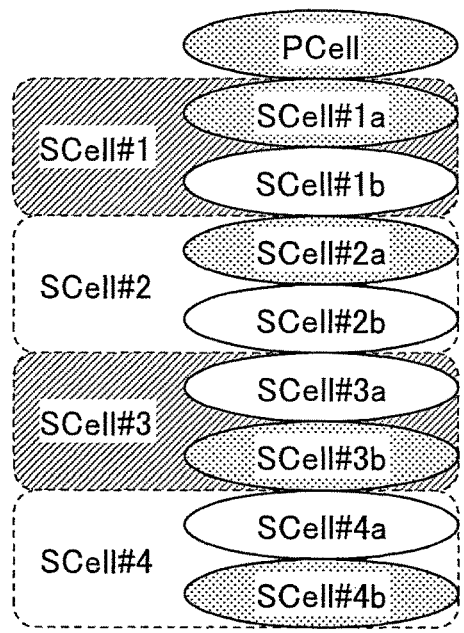
FIG. 19A is a drawing illustrating an operation example in the case where the control target sub cell is changed.
Figure 19B:
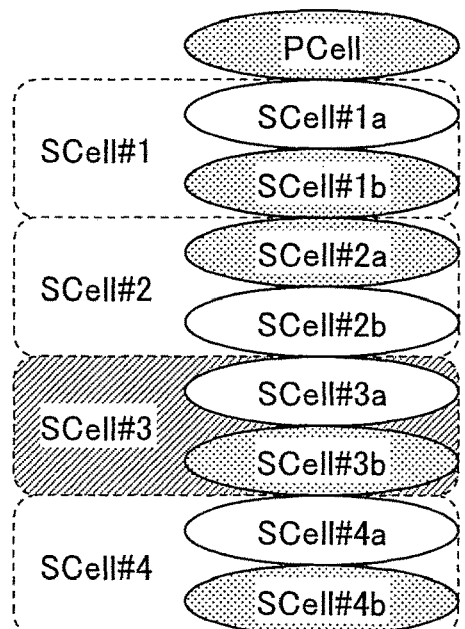
FIG. 19B is a drawing illustrating an operation example in the case where the control target sub cell is changed.
Figure 19C:
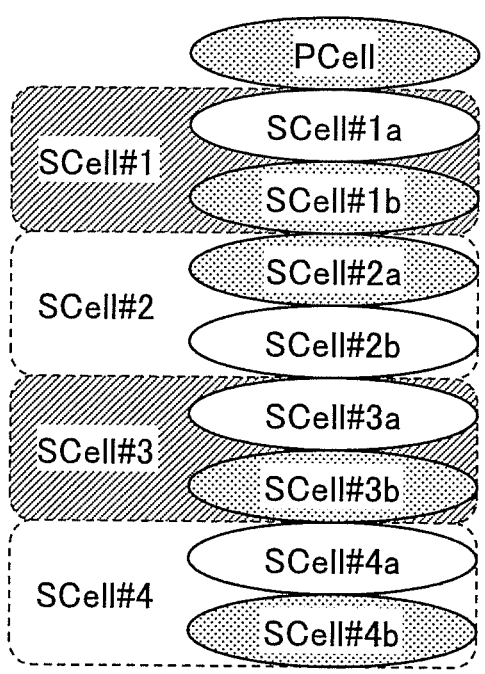
FIG. 19C is a drawing illustrating an operation example in the case where the control target sub cell is changed.

FIGS. 19A through 19C are drawings illustrating an operation example in the case where the control target sub cell is changed. SCell #1 through SCell #4 indicate SCell groups. Further, shaded groups of the SCell groups (e.g., SCell #1 and SCell #3 in FIG. 19A) indicate that the control target sub cell of the sub cells belonging to the shaded groups is in an activated state. Further, non-shaded groups of the SCell groups (e.g., SCell #2 and SCell #4 in FIG. 19A) indicate that all of the sub cells belonging to the non-shaded groups is in a deactivated state. Further, shaded parts of the SCell #1a through SCell #4b (e.g., SCell #1a, SCell #2b, SCell #3b, SCell #4b) indicate the control target sub cells.

First, according to the processing steps of step S401 through step S404 in FIG. 18, SCell #1 is deactivated. Further, in the case where it is instructed that the control target sub cell should be switched from SCell #1a to SCell #1b, the state of FIG. 19A transitions to the state of FIG. 19B. Subsequently, according to processing steps of step S405 and step S406 in FIG. 18, in the case where it is instructed that SCell #1 should be activated, the state of FIG. 19B transitions to the state of FIG. 19C.

As described above, processing steps have been described in the case where the control target sub cell is changed in the predetermined SCell group in a mobile communication system according to an embodiment.

It should be noted that, in a mobile communication system according to an embodiment, in the case where the control target sub cell is not changed and only a process of deactivating a cell is performed, the user apparatus 1 and the base station 2 may perform the same processing steps as step S403 and step S404 out of the processing steps of FIG. 18.

(Cell Removing Process in CA)

Figure 20:
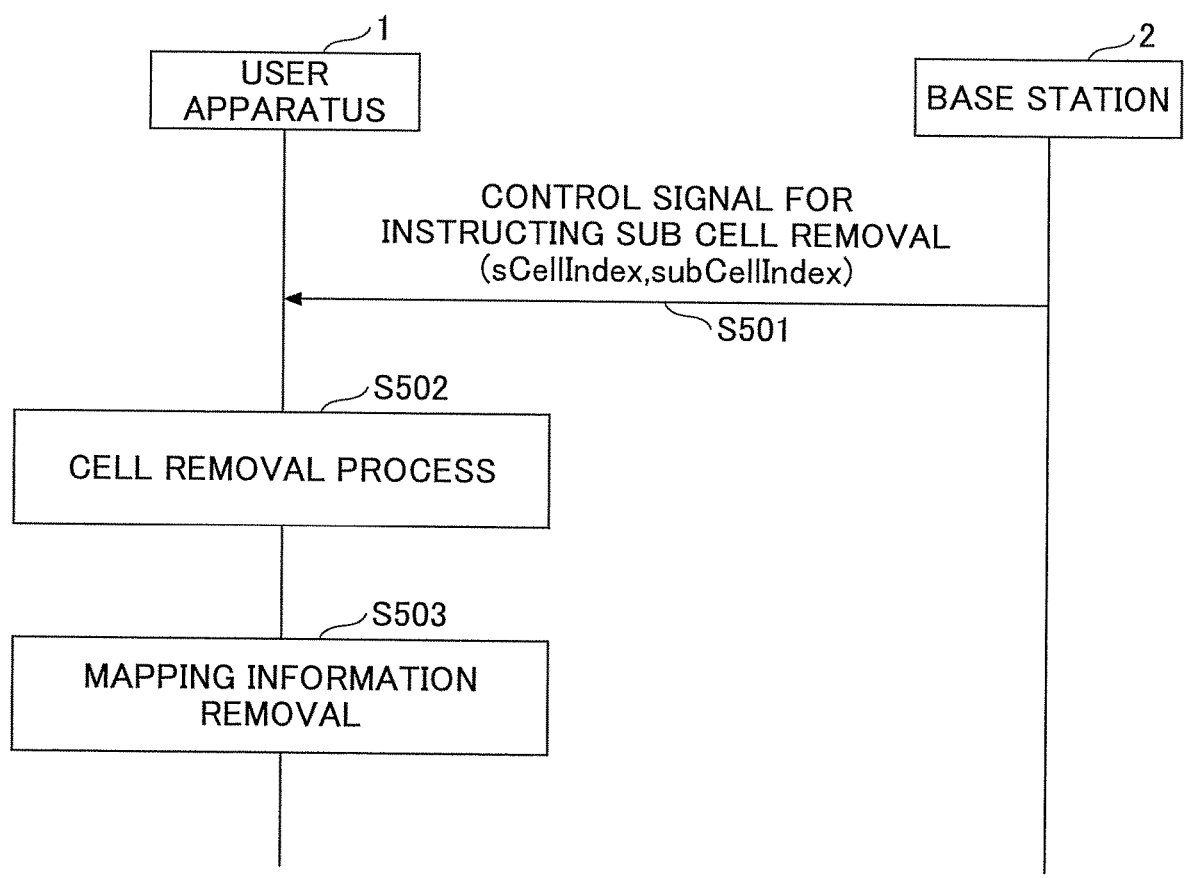
FIG. 20 is a sequence diagram illustrating an example of processing steps (cell removing process) according to an embodiment.

FIG. 20 is a sequence diagram illustrating an example of processing steps (cell removing process) according to an embodiment. Referring to FIG. 20, processing steps will be described in the case where a cell (sub cell) in CA is removed in a mobile communication system according to an embodiment.

In step S501, the RRC processing unit 203 of the base station 2 transmits to the user apparatus 1 a control signal for instructing the user apparatus 1 to remove a cell in CA. In the control signal, sCellIndex and subCellIndex of an SCell which is going to be removed are included. It should be noted that the RRC processing unit 203 of the base station 2 may instruct the user apparatus 1 to remove multiple cells by using the control signal. The control signal is, for example, an RRC connection reconfiguration signal.

In step S502, the RRC processing unit 103 and the cell control unit 105 of the user apparatus 1 perform processes in which sub cells specified in step S501 are removed from CA cells. It should be noted that, in the case where the sub cell specified in step S501 is in an activated state, the RRC processing unit 103 and the cell control unit 105 of the user apparatus 1 may perform processing steps of step S502 after deactivating the sub cell, or after deactivating the sub cell and further activating another sub cell belonging to the same SCell group as the deactivated sub cell.

In step S503, the mapping management unit 104 of the user apparatus 1 removes a record from the records of the mapping information, which record includes sCellIndex and subCellIndex specified in step S501.

As described above, processing steps have been described in the case where a CA cell (sub cell) is removed in a mobile communication system according to an embodiment. However, the user apparatus 1 and the base station 2 may perform processing steps of step S501 through S503 after changing the control target sub cell to a sub cell other than the removing target sub cell according to processing steps of step S401 and step S402 of FIG. 18. Further, in the case where the removing target sub cell has been activated, the user apparatus 1 and the base station 2 may perform processing steps of step S501 through S503 after changing the activated sub cell to a sub cell other than the removing target sub cell according to the processing steps of step S401 and step S406 of FIG. 18.

<Effect>

As described above, in a mobile communication system according to an embodiment, by grouping multiple SCells used for CA into SCell groups, and by determining in advance which sub cell should be a control target in one or more sub cells included in the SCell group, it is possible to transmit an instruction of cell activation/deactivation for an SCell group. In other words, in a mobile communication system according to an embodiment, an SCell group is defined as a virtual SCell, and a conventional control mechanism performed for each SCell is applied to the virtual SCell. With the above operation, in the mobile communication system according to an embodiment, even in the case where CA in which many CCs are bundled is performed, utilizing existing processing steps, it is possible to perform CA in a range of CCs which the user apparatus 1 can control simultaneously.

Further, in a mobile communication system according to an embodiment, it is possible to transmit from the base station 2 to the user apparatus an instruction specifying a control target sub cell, and switching the control target sub cell. With the above operation, in an mobile communication system according to an embodiment, it is possible to specify any of the sub cells included in the SCell group as a control target. Further, with the above operations, in an mobile communication system according to an embodiment, it is possible to perform such a process as switching the activated SCell to an SCell having a good propagation state appropriately, and it is possible to improve the throughput by increasing the degree of scheduling freedom.

Further, in a mobile communication system according to an embodiment, in the case where the user apparatus 1 has received an instruction for performing cell activation for an SCell group in a state where which sub cell of one or more sub cells included in the SCell group is a control target has not been determined, the user apparatus 1 activates, for example, a sub cell with the lowest (or the highest) frequency band, or activates sub cells according to the order with which the base station 2 has instructed addition of the sub cells. With the above operations, it is possible for a user apparatus 1 according to an embodiment to activate a sub cell included in the SCell group, and perform communications using multiple cells according to CA even in the case where an instruction related to a control target sub cell has not been received from the base station 2.

Further, in a mobile communication system according to an embodiment, in the case where the user apparatus 1 and the base station 2 are going to add a new sub cell to an SCell group, it is possible to use (refer to) the same setting information (configuration information) as the sub cell which has been added to the SCell group in the past, of the various types of setting information items related to the going-to-be-added cell (including a bandwidth, information related to physical channel configuration, TDD configuration information, etc.) With the above operations, it is possible for a mobile communication system according to an embodiment to reduce the signal amount of the control signal communicated between the user apparatus 1 and the base station 2.

Further, in a mobile communication system according to an embodiment, in the case where the base station 2 specifies the control target sub cell, it is possible to specify a downlink subCC and an uplink subCC, individually. With the above arrangement, in a mobile communication system according to an embodiment, it is possible to improve throughput by using an appropriate subCC for downlink and an appropriate subCC for uplink at the time of specifying subCC.

Embodiment Summary

As described above, according to an embodiment, in a mobile communication system in which carrier aggregation is supported, a user apparatus communicating with a base station is provided. The user apparatus includes a processing unit configured to accept from the base station an instruction for adding one or more sub cells corresponding to a specific secondary cell group; a management unit configured to store information in which the specific secondary cell group is associated with the one or more sub cells upon accepting the instruction; and a control unit configured to, in the case where a command for performing an operation for the specific secondary cell group is received from the base station, perform the operation for any one of the one or more sub cells based on the association.

The management unit may receive a command for specifying a control target sub cell out of the one or more sub cells corresponding to the specific secondary cell group, and further update the information about the control target sub cell based on the received command.

The control unit may activate or deactivate the control target sub cell in the case where a command for activating or deactivating the specific secondary cell group is received from the base station.

In the case where a command for switching the control target sub cell in the one or more sub cells corresponding to the specific secondary cell group is received, the control unit may deactivate the sub cell which has been activated before the switching.

The command for specifying the control target sub cell or the command for switching the control target sub cell may be a command defined in MAC CE.

In the case where a command for switching the control target sub cell in the one or more sub cells corresponding to the specific secondary cell group is received from the base station, the control unit may perform switching the activated sub cell at the timing of the command reception or after an elapse of a predetermined period after the command reception.

In the case where a command for switching the control target sub cell in the one or more sub cells corresponding to the specific secondary cell group is received from the base station and the control unit transmits sub cell quality information to the base station while performing switching process of the activated sub cell, the control unit may transmit to the base station the quality information in which a value equal to or less than a predetermined value or a value out of range is set.

In the case where a command for switching the control target sub cell in the one or more sub cells corresponding to the specific secondary cell group is received from the base station and the control unit performs switching the activated sub cell, the control unit may transmit to the base station at least one of a power margin and a buffer status of the sub cell after the switching.

In the case where a command for activating or deactivating the specific secondary cell group from the base station, the control unit may select any one of the sub cells based on the frequency bands of the one or more sub cells, or based on the order with which instructions for adding one or more sub cells have been received.

Further, according to an embodiment, in a mobile communication system including a user apparatus and a base station which support carrier aggregation, a cell control method is provided. The cell control method includes instructing, by the base station, addition of one or more sub cells corresponding to a specific secondary cell group; receiving, by the user apparatus, the instruction of addition of one or more sub cells corresponding to the specific secondary cell group; storing, by the user apparatus, information in which the specific secondary cell group is associated with the one or more sub cells upon receiving the instruction; and performing, by the user apparatus, in the case where the user apparatus receives from the base station a command for performing an operation for the specific secondary cell group, the operation for any one of the one or more sub cells based on the association.

Further, the "unit" included in the above apparatus may be substituted by "means", "circuit", "device", etc.

Supplementary Description of Embodiment

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus 1 and the base station 2 have been described using functional block diagrams. These apparatuses may be implemented by hardware, by software, or by combination of both. The software which is executed by a processor included in a user apparatus 1 according to an embodiment and the software which is executed by a processor included in a base station 2 may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

The present invention is not limited to the above embodiments and various variations, modifications, alternatives, replacements, etc., may be included in the present invention without departing from the spirit of the invention.

It should be noted that the RRC processing unit 103 in an embodiment is an example of a processing means or a processing step. Further, the mapping management unit 104 is an example of a management means or a management step. Further, the cell control unit 105 is an example of a control means or a control step. The cell control instruction unit 205 is an example of a control means or a control step.

The present application is based on and claims the benefit of priority of Japanese Priority Application No. 2015-032256 filed on Feb. 20, 2015, the entire contents of which are hereby incorporated by reference.

DESCRIPTION OF THE REFERENCE NUMERALS

1 User apparatus
2 Base station
101 DL signal reception unit
102 UL signal transmission unit
103 RRC processing unit
104 Mapping management unit
105 Cell control unit
201 DL signal reception unit
202 UL signal transmission unit
203 RRC processing unit
204 Mapping management unit
205 Cell control instruction unit
301 RF module
302 BB processing module
303 UE control module
401 RF module
402 BB processing module
403 Apparatus control module
404 Communication IF

What is claimed is:

1. A user apparatus performing communications with a base station in a mobile communication system which supports carrier aggregation, the user apparatus comprising:
   a receiver that receives from the base station an instruction for adding one or more sub cells associated with a specific secondary cell group, wherein the specific secondary cell group is a subset of a plurality of secondary cells under the base station; and
   a processor, coupled to the receiver, a transmitter, and a memory device, that, upon receiving the instruction, stores information in which the specific secondary cell group is associated with the one or more sub cells,
   wherein the processor receives, via the receiver, from the base station a command specifying a control target sub cell out of the one or more sub cells associated with the specific secondary cell group, and further updates the information with the control target sub cell based on the received command,
   wherein the processor, in the case where a command for activating the specific secondary cell group is received from the base station, activates the control target sub cell, and
   wherein, in the case where a physical downlink control channel (PDCCH) signal for switching the control target sub cell out of the one or more sub cells associated with the specific secondary cell group is received from the base station, the processor performs a switching process of the activated control target sub cell from a first sub cell to a second sub cell at a timing of the PDCCH signal reception or after an elapse of a predetermined period after the PDCCH signal reception, and transmits, via the transmitter, to the base station a new power margin of the control target sub cell after the switching, the control target sub cell being active after the switching.

2. The user apparatus according to claim 1, wherein, in the case where the PDCCH signal for switching the control target sub cell out of the one or more sub cells associated with the specific secondary cell group is received from the base station and the processor transmits, via the transmitter, sub cell quality information to the base station while performing the switching process of the activated control target sub cell, the processor transmits, via the transmitter, to the base station the quality information in which a value equal to or less than a predetermined value or a value out of range is set.

3. The user apparatus according to claim 1, wherein, in the case where a command for activating or deactivating the specific secondary cell group is received from the base station, the processor selects any one of the sub cells based on frequency bands of the one or more sub cells, or based on the order with which the instruction for adding one or more sub cells has been received.

4. A cell control method in a mobile communication system which supports carrier aggregation and includes a user apparatus and a base station, the cell control method comprising:

transmitting, by the base station, an instruction for adding one or more sub cells associated with a secondary cell;

receiving, by the user apparatus, the instruction for adding one or more sub cells associated with a specific secondary cell group, wherein the specific secondary cell group is a subset of a plurality of secondary cells under the base station;

storing, by the user apparatus, information in which the specific secondary cell group is associated with the one or more sub cells;

receiving from the base station a command specifying a control target sub cell out of the one or more sub cells associated with the specific secondary cell group, and updating the information with the control target sub cell based on the received command, and performing, in the case where a command for activating the specific secondary cell group is received from the base station, activation of the control target sub cell, and in the case where a physical downlink control channel (PDCCH) signal for switching the control target sub cell out of the one or more sub cells associated with the specific secondary cell group is received from the base station, performing switching of the activated control target sub cell from a first sub cell to a second sub cell at a timing of the PDCCH signal reception or after an elapse of a predetermined period after the PDCCH signal reception, and transmitting, to the base station, a new power margin of the control target sub cell after the switching, the control target sub cell being active after the switching.

* * * * *